Patented Mar. 5, 1935

1,993,031

UNITED STATES PATENT OFFICE 1,993,031

TERPENE-MALEIC ANHYDRIDE REACTION PRODUCT AND METHOD OF PRODUCING

Ernest G. Peterson, Wilmington, Del., assignor to Hercules Powder Company, Wilmington, Del., a corporation of Delaware No Drawing. Application August 4, 1933, Serial No. 683,627

14 Claims. (Cl. 260—123)

This invention relates to a terpenemaleic anhydride reaction product and to a method for its production.

Heretofore it has been known to react maleic anhydride and phellandrene for the production of a crystalline compound, such being disclosed in the British patent to Diels & Alder, No. 300,130 of 1928; and further, it has been known to produce an amorphous resinous product by reacting maleic anhydride and alpha-terpinene, such being the subject matter disclosed in an application for United States patent filed by Ernest G. Peterson and Edwin R. Littmann November 18, 1930, Serial No. 496,560.

Now, in accordance with this invention I have discovered that an amorphous resinous compound, variously advantageous for use in the commercial arts, is produced by reacting maleic anhydride, or variously equivalently maleic acid, with a terpene hydrocarbon, characterized by the fact that it does not have any conjugated system of double bonds or equivalently a terpene cut comprising largely one or a mixture of terpene hydrocarbons not having any conjugated system of double bonds.

The term "terpene hydrocarbon" as used throughout this specification refers solely to those terpene hydrocarbons having the formula $C_{10}H_{16}$, often known as true terpenes or terpenes proper.

Generally speaking, the terpene hydrocarbons not having any conjugated system of double bonds comprise alpha-pinene (B. P. about 153–157° C.), beta pinene (B. P. about 160–168° C.), dipentene (B. P. about 170–178° C.) and its isomers, as d- and l- limonene, and terpinolene (B. P. about 183–185° C.).

A terpene cut including the several terpene hydrocarbons not having any conjugated system of double bonds will boil, generally speaking, within about the range 150–190° C. As equivalent for the several hydrocarbons in a relatively pure state, terpene cuts relatively rich in the hydrocarbons respectively, may be utilized. Thus, a terpene cut boiling within about the range 150–165° C. will be relatively rich in alpha-pinene. A terpene cut boiling within about the range 160–170° C. will be relatively rich in beta pinene, while also containing some alpha-pinene. A terpene cut boiling within about the range 150–170° C. will be relatively rich in both alpha and beta pinene. A terpene cut boiling within about the range 170–178° C. will be relatively rich in dipentene, while a terpene cut boiling within about the range 182–190° C. will be relatively rich in terpinolene. The terpene cuts relatively rich in the several hydrocarbons not having any conjugated system of double bonds or cuts relatively rich in mixtures thereof will variously contain other terpenes or impurities, which, however, will not affect the carrying out of the process in accordance with this invention for the production of the various products contemplated and which may readily be separated from the final product. Thus, for example, a terpene cut boiling within the range 182–190° C. consists largely of terpinolene (B. P. 183–185° C.), will contain certain amounts of terpene alcohols, such as fenchyl alcohol and borneol, and also will contain some pinene and some dipentene. Where a terpene cut boiling within about the range 182–190° C. is used, however, the product will largely involve the reaction product of maleic anhydride and terpinolene, with possible admixture of other reaction products in relatively small amount.

In proceeding for the practical adaptation of the method in accordance with this invention for the production of the various products contemplated by this invention, a terpene hydrocarbon not having any conjugated system of double bonds in a more or less pure state, or a mixture of such hydrocarbons, or a terpene cut relatively rich in any one of such hydrocarbons, or a cut including a mixture of such hydrocarbons, will be reacted with maleic anhydride or with equivalent amounts of maleic acid. The reaction may be effected in any suitable manner, but will preferably be carried out with refluxing in the presence of heat, which will facilitate and expedite the reaction. If desired, reaction may be carried out under superatmospheric pressure. In certain cases fumaric acid, which, as is well known, will be converted into maleic anhydride by heat, may be used, if desired, in place of maleic anhydride or equivalent amounts of maleic acid. In proceeding it will be desirable to use an excess of the hydrocarbon, which on completion of the reaction will be vaporized off.

The product contemplated by this invention will be variously characterized, depending upon the particular hydrocarbon used, or upon the particular terpene cut used for its production. The product, generally speaking, will be a light colored amorphous resin, the particular characteristics of which will be dependent upon the particular terpene used and to a degree upon the particular procedure followed in carrying out the method. Generally speaking the product will be a soft resin of light color and adaptable for various uses in the commercial arts where the use of a synthetic resin is dictated or desirable. The product will be highly advantageous for use, for example, as an ingredient of coating compositions, plastics and the like and will be found to have good film forming capacity and to be compatible variously with nitrocellulose, drying oils, etc., etc. rendering it advantageous for use in lacquers and varnishes, etc., etc.

As illustrative of the practical adaptation of the method of this invention, the terpene hydrocarbon not having any conjugated system of double bonds, or mixture of such hydrocarbons, or a terpene cut relatively rich in one or another of such hydrocarbons or a mixture thereof, will be reacted with maleic anhydride or an equivalent amount of maleic acid, preferably in the presence of heat at a temperature say within the range 150–200° C. Desirably, the terpene hydrocarbon or terpene cut will be in excess and the product on completion of the reaction will be separated from the excess of terpene hydrocarbon or terpene cut and any impurities by distillation, for example, by maintaining the reaction temperature and reducing the pressure. The reaction may be carried out variously at atmospheric or superatmospheric pressure and, if desired, may be carried out in the presence of a catalyst. In the practical adaptation of the method in accordance with this invention any suitable form of apparatus may be used. As more specifically illustrative of the practical adaptation of the method in accordance with this invention, for example, 60 parts of alpha-pinene (B. P. 153–157° C.), 20 grams maleic anhydride and 0.2 grams paratoluene sulphonic acid are refluxed at a temperature of about 165–185° C., in any suitable form of apparatus for about 8 hours, and excess of unreacted pinene distilled off under reduced pressure. The product obtained, amounting to about 39 parts, will comprise a soft resin. The product, if desired, may be separated into volatile and non-volatile portions by heating under reduced pressure, say about 5 mm. mercury, up to a bath temperature of say about 275–300° C.

In the above example the product comprises a reaction product of the alpha-pinene and maleic anhydride. In the procedure outlined the paratoluene sulphonic acid acts as a catalyst.

As further illustrative, for example, 400 parts of alpha-pinene and 100 parts of maleic anhydride are heated in an autoclave at a temperature of about 170–175° C. under a pressure of about 5–10 pounds, for a period of three hours. On distillation off of the excess pinene, which may be effected by maintenance of the reaction temperature and reduction of the pressure, about 122 parts of a soft, yellow resin will be obtained. An increased yield may be obtained by the use of a higher temperature and pressure, as, for example, a temperature of about 180–185° C. and a pressure of about 25 pounds will, after a period of about 3 hours, yield about 165 parts of a soft resin on distillation off of excess pinene.

As illustrative of the practical adaptation of the method in accordance with this invention with the use of beta-pinene, for example, 45 parts of beta-pinene (B. P. 160–168° C.) and 25 parts of maleic anhydride are heated under atmospheric pressure for a period of about 5 hours at a temperature of about 170 to 190° C. On distillation off of excess beta-pinene, for example, by maintenance of the reaction temperature and reduction in pressure, a soft resin will be obtained. In proceeding with the use of beta-pinene superatmospheric pressure may be used, as may also a catalyst.

As further illustrative, instead of alpha or beta-pinene, corresponding terpene cuts relatively rich in alpha or beta-pinene may be used.

As illustrative of procedure in accordance with this invention with the use of dipentene (B. P. about 175° C.), for example 200 parts by weight of dipentene and 100 parts by weight of maleic anhydride are heated at a temperature of about 175–200° C., with refluxing for a period of about 3–5 hours and excess dipentene then distilled off by maintaining the reaction temperature and reducing the pressure. The product will be a soft, light yellow gum amounting to about 150 parts by weight. In the procedure outlined a terpene cut boiling within the range about 170–178° C. may be used in place of the dipentene. Likewise, isomers of dipentene as di-limonene and l-limonene, the active forms of dipentene, which is a d-l-limonene, may be used.

As further illustrative of the practical adaptation of this invention using terpinolene (B. P. 183–185° C.), or a terpene cut boiling within about the range 182–190° C. and which will be rich in terpinolene, for example, about 480 grams of a terpene cut boiling within about the range 182–190° C. and about 294 grams of maleic anhydride are heated at a temperature to cause gentle boiling, say about 150–200° C. for a period of about 5 hours. On completion of the heating period excess of the terpene cut and impurities insofar as such may be present, are removed, say distilled off by maintenance of the reaction temperature and reduction of the pressure. The product will be about 600 grams of a fairly soft resin.

The terpene cuts variously described in connection with the carrying out of the method in accordance with this invention may be obtained by distillation from pine stump wood or by fractionation from turpentine, obtained from dead pine wood or by distillation of oleo resin. Thus, for example, alpha and beta-pinene, or terpene cuts rich therein, may be obtained by fractionation of turpentine. Dipentene and terpinolene and terpene cuts relatively rich therein may be obtained by fractionation from, for example, steam distillation products of pine wood, as stump wood, down wood, and the like.

In proceeding in accordance with the method embodying this invention, it will be understood that equivalent amounts of maleic acid may be used in substitution for maleic anhydride, though generally the use of maleic anhydride will be preferred. Likewise, the method may be carried out within wide ranges of temperature, it being only necessary to use a temperature at which the reaction will proceed, it being noted that the use of any particular temperature will only largely affect the rate of the reaction and the amount of the yield. Further, the method may be carried out with the use of atmospheric or superatmospheric pressure within a wide range, the effect of the use of superatmospheric pressure being largely upon the rate at which the reaction proceeds. Likewise, catalysts such as paratoluene sulphonic acid, sulphuric acid, zinc chloride, or the like, may or may not be used as desired.

It will be noted that on completion of the reaction, the product will be readily recovered by distillation off of the excess reagents and impurities such as may be present.

The product, as has been indicated, will, generally speaking, comprise a soft, amorphous, resinous material of light color, the particular characteristics of which in any particular case will depend upon the particular hydrocarbon used for its production and to a degree upon the particular conditions under which the reaction is carried out.

The product, as has been indicated, will be variously usable in the commercial arts and in particular in coating compositions, thermoplastics, and the like, etc., etc.

The product may be used as such or may be reacted with monohydric alcohols to form esters, which will be found valuable for use variously in the commercial arts, as, for example, coating compositions, and may be reacted with polyhydric alcohols with or without modifying agents, such as fatty acids, vegetable oils, resins, etc., etc. for the production of products valuable for use in the commercial arts, as for example, in coating compositions, plastics, etc., etc.

This application is filed as a continuation in part of my application for patent for Improvement in new composition of matter and method of producing, Serial No. 648,234, filed December 21, 1932.

What I claim and desire to protect by Letters Patent is:

1. The product of the reaction of a terpene hydrocarbon of the formula $C_{10}H_{16}$ and characterized by the fact that it does not have any conjugated system of double bonds, and maleic anhydride.

2. The product of the reaction of maleic anhydride and a terpene cut boiling within the range from about 182 to about 190° C.

3. The product of the reaction of maleic anhydride and terpinolene.

4. The method of producing a resinous composition, which includes reacting maleic anhydride and a terpene hydrocarbon of the formula $C_{10}H_{16}$ and characterized by the fact that it does not have any conjugated system of double bonds.

5. The method of producing a resinous composition, which includes heating to reaction temperature maleic anhydride and a terpene hydrocarbon of the formula $C_{10}H_{16}$ and characterized by the fact that it does not have any conjugated system of double bonds.

6. The method of producing a resinous composition, which includes heating to reaction temperature maleic anhydride and a terpene hydrocarbon of the formula $C_{10}H_{16}$ and characterized by the fact that it does not have any conjugated system of double bonds, under superatmospheric pressure.

7. The method of producing a resinous composition, which includes reacting maleic anhydride and a terpene hydrocarbon of the formula $C_{10}H_{16}$ and characterized by the fact that it does not have any conjugated system of double bonds, in the presence of a catalyst.

8. The method of producing a resinous composition, which includes heating to reaction temperature maleic anhydride and a terpene hydrocarbon of the formula $C_{10}H_{16}$ and characterized by the fact that it does not have any conjugated system of double bonds, in the presence of a catalyst.

9. The method of producing a resinous composition, which includes reacting maleic anhydride and a terpene cut boiling within the range from about 182 to about 190° C.

10. The method of producing a resinous composition, which includes heating to reaction temperature maleic anhydride and a terpene cut boiling within about the range 182–190° C.

11. The method of producing a resinous composition which includes reacting maleic anhydride and terpinolene.

12. The method of producing a resinous composition which includes heating to reaction temperature maleic anhydride and terpinolene.

13. The method of producing a resinous composition which includes heating to reaction temperature maleic acid and a terpene hydrocarbon of the formula $C_{10}H_{16}$ and characterized by the fact that it does not have any conjugated system of double bonds.

14. The method of producing a resinous composition which includes heating to reaction temperature fumaric acid and a terpene hydrocarbon of the formula $C_{10}H_{16}$ and characterized by the fact that it does not have any conjugated system of double bonds.

ERNEST G. PETERSON.